(12) United States Patent  
Huang

(10) Patent No.: US 11,888,307 B2  
(45) Date of Patent: Jan. 30, 2024

(54) ISOLATION CIRCUIT SYSTEM AND SIGNAL ISOLATION METHOD THEREOF

(71) Applicant: GREE ELECTRIC APPLIANCES, INC. OF ZHUHAI, Guangdong (CN)

(72) Inventor: Qiao Huang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 331 days.

(21) Appl. No.: 17/288,495

(22) PCT Filed: Oct. 10, 2019

(86) PCT No.: PCT/CN2019/110326  
§ 371 (c)(1),  
(2) Date: Apr. 23, 2021

(87) PCT Pub. No.: WO2020/114074  
PCT Pub. Date: Jun. 11, 2020

(65) Prior Publication Data  
US 2021/0391704 A1     Dec. 16, 2021

(30) Foreign Application Priority Data  
Dec. 3, 2018   (CN) .......................... 201811465316.2

(51) Int. Cl.  
*G01R 31/00* (2006.01)  
*H02H 3/12* (2006.01)  
(Continued)

(52) U.S. Cl.  
CPC ............... *H02H 3/12* (2013.01); *G06F 1/28* (2013.01); *G06F 1/305* (2013.01); *H02H 1/0007* (2013.01); *G06F 2119/06* (2020.01)

(58) Field of Classification Search  
USPC ............................ 324/76.11, 713; 713/320  
See application file for complete search history.

(56) References Cited

U.S. PATENT DOCUMENTS 6,144,219 A     11/2000   Palaniswami  
8,570,788 B2 *  10/2013   Hess ..................... G06F 1/3203  
                                          365/226

(Continued)

FOREIGN PATENT DOCUMENTS

| CN | 2730049 Y | 9/2005 |
| CN | 101441611 A | 5/2009 |

(Continued)

*Primary Examiner* — Vincent Q Nguyen  
(74) *Attorney, Agent, or Firm* — J. Miguel Hernandez; James R. Gourley; Carstens, Allen & Gourley, LLP

(57) ABSTRACT

Isolation circuit system and a signal isolation method thereof. The system includes: a power management unit, configured to output a first signal to a digital logic circuit when power down is detected in a first circuit area, and output a second signal to the digital logic circuit when no power down is detected in the first circuit area; the digital logic circuit, configured to perform logical processing on the first signal received from the power management unit before outputting an isolation signal to the isolation circuit, and perform logical processing on the second signal received from the power management unit before outputting a connection signal to the isolation circuit; and the isolation circuit, configured to block the interactive signal, or to output the interactive signal to a second circuit area after the interactive signal is processed through voltage stabilization.

9 Claims, 5 Drawing Sheets

(51) Int. Cl.
*G06F 1/28* (2006.01)
*G06F 1/30* (2006.01)
*H02H 1/00* (2006.01)
G06F 119/06 (2020.01)

(56) References Cited

U.S. PATENT DOCUMENTS

2013/0238916 A1* 9/2013 Dohm ................. G06F 1/32
 713/320
2017/0110982 A1* 4/2017 Tuladhar ........... H02M 7/53873
2018/0316180 A1 11/2018 Batenburg et al.

FOREIGN PATENT DOCUMENTS

| CN | 102496907 A | 6/2012 |
| CN | 102694542 A | 9/2012 |
| CN | 103138722 A | 6/2013 |
| CN | 103257265 A | 8/2013 |
| CN | 103324268 A | 9/2013 |

* cited by examiner

ISOLATION CIRCUIT SYSTEM AND SIGNAL ISOLATION METHOD THEREOF

CROSS REFERENCE TO RELATED APPLICATION

This application is a national phase application of international patent application PCT/CN2019/110326, entitled "Isolation Circuit System and Signal Isolation Method Thereof" filed on Oct. 10, 2019, and published as WO 2020/114074 on Jun. 11, 2020, which claims priority to Chinese Patent Application No. 201811465316.2, entitled "Isolation Circuit System and Signal Isolation Method Thereof", filed on Dec. 3, 2018, the content of which is expressly incorporated herein by reference in its entirety. Every patent application and publication listed in this paragraph is hereby incorporated by reference in its entirety.

TECHNICAL FIELD

The present disclosure relates to the field of low power consumption circuit technology, and more particularly to an isolation circuit system and a signal isolation method thereof.

BACKGROUND

In the actual application of the low power consumption technology, multiple voltage domains are common in the current SOC system, so that some unwanted voltage domains can be turned off when the system application is in standby, leaving the normally open voltage domain of the battery-powered application wake-up circuit. In multiple voltage domains, except for the normally open voltage domain, other signals that interact with the normally open voltage domain may encounter a sudden external power failure, and the interaction state with the signal of the normally open voltage domain may not stable and uncontrollable, and there is the possibility of maloperation of the control circuit of the normally open voltage domain, and even resulting in abnormal wake-up of the normally open voltage domain, inability to wake up the circuit again, etc.

The isolation circuit is often applied in the signal interaction between two voltage domains to isolate a signal inputted from the power-down area to the normally open voltage domain, so that the signal inputted from the power-down area is stabilized in a fixed state to reduce the electrical domain leakage caused by a power-down signal at an intermediate level, and when the power is off in the power-down area, the signal inputted to the power-on area is controllable.

The isolation circuit of the related technology adopts the microprocessor CPU to actively initiate the power down, that is, the microcontroller first initiates a signal to control the isolation circuit, and changes the signal inputted from the power-down area to the normally open voltage domain to an invalid signal and maintains it at a fixed state, and then initiates a power-down signal to the power management unit (PMU).

SUMMARY

The present disclosure provides an isolation circuit system and a signal isolation method thereof, in order to solve the problem of a failure to timely maintain the signal inputted to a normally open voltage domain in a fixed state when the isolation circuit adopts a microprocessor to stabilize circuit signals in the field of low power consumption technology, which causes a high probability of abnormal operation of the normally open voltage domain.

In the first aspect of the present disclosure, an isolation circuit system is provided, which includes:

a power management unit, configured to output a first signal to a digital logic circuit when power down is detected in a first circuit area, and output a second signal to the digital logic circuit when no power down is detected in the first circuit area;

the digital logic circuit, configured to perform logical processing on the first signal received from the power management unit before outputting an isolation signal to the isolation circuit, and perform logical processing on the second signal received from the power management unit before outputting a connection signal to the isolation circuit; and the isolation circuit, configured to simultaneously receive an interactive signal from the first circuit area and the isolation signal from the digital logic circuit and block the interactive signal, or to simultaneously receive the interactive signal from the first circuit area and the connection signal from the digital logic circuit and output the interactive signal to a second circuit area after the interactive signal is processed through voltage stabilization.

In the second aspect of the present disclosure, a signal isolation method for an isolation circuit system is provided, which includes:

outputting, by a power management unit, a first signal to a digital logic circuit when power down is detected in a first circuit area, and outputting a second signal to the digital logic circuit when no power down is detected in the first circuit area;

performing, by the digital logic circuit, logical processing on the first signal received from the power management unit before outputting an isolation signal to the isolation circuit, and performing logical processing on the second signal received from the power management unit before outputting a connection signal to the isolation circuit; and simultaneously receiving, by the isolation circuit, an interactive signal from the first circuit area and the isolation signal from the digital logic circuit, and blocking the interactive signal, or simultaneously receiving the interactive signal from the first circuit area and the connection signal from the digital logic circuit, and outputting the interactive signal to a second circuit area after the interactive signal is processed through voltage stabilization.

In the present disclosure, the power management unit monitors the power down of the first circuit area in real time, and issues the first signal and the second signal according to the power down, and the logic digital circuit sends the isolation signal/connection signal to the isolation circuit; when the first power down area is powered down, the unstable interactive signal after the power down of the first power down area is isolated timely to avoid outputting to the second circuit area, thereby reducing a condition of unstable circuit system caused by a maloperation of the interactive signal when sudden power down occurs, and improving the stability of the isolation circuit system.

DETAILED DESCRIPTION

In order to make the purposes, technical solutions, and advantages of the present disclosure clearer, the photovoltaic assembly clean system of the present disclosure will be further detailed below through the embodiments in conjunction with the accompanying drawings. It should be understood that the specific embodiments described here are merely used for explaining the disclosure, rather than limiting the present disclosure.

Embodiment I

Figure 1A:
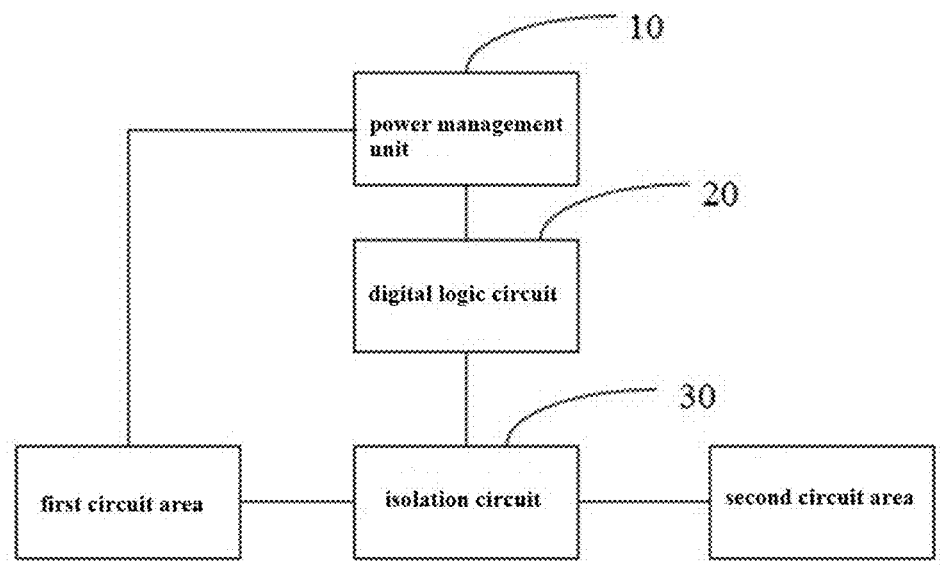
FIG. 1A is a system schematic diagram illustrating an isolation circuit system according to an embodiment I of the present disclosure.

The present disclosure provides an isolation circuit system, as shown in FIG. 1A, including:

a power management unit 10, configured to output a first signal to a digital logic circuit when power down is detected in a first circuit area, and output a second signal to the digital logic circuit when no power down is detected in the first circuit area;

a digital logic circuit 20, configured to logically process the first signal received from the power management unit before outputting an isolation signal to the isolation circuit, and to logically process the second signal received from the power management unit before outputting a connection signal to the isolation circuit;

an isolation circuit 30, configured to simultaneously receive an interactive signal from the first circuit area and the isolation signal from a digital logic circuit, and block the interactive signal; or to simultaneously receive the interactive signal from the first circuit area and the connection signal from the digital logic circuit, and output the interactive signal to a second circuit area after the interactive signal is processed through voltage stabilization.

In the embodiment, in the above-mentioned isolation circuit system, the voltage situation of the first circuit area is monitored in real time through the power management unit, and it is determined whether the first circuit area has power down according to the monitored voltage situation of the first circuit area, and the first signal/second signal is transmitted to the digital logic circuit according to a determination result to indicate the power down of the first circuit area to the digital logic circuit. As an optional embodiment, when the power management unit detects the power down in the first circuit area, the first signal is transmitted to the digital logic circuit. In some embodiment, the value of the first signal is set to 1 (that is, regarded as a high-level signal); when no power down is detected in the first circuit area, the second signal is transmitted to the digital logic circuit, and the value of the second signal is set to 0 (that is, regarded as a low-level signal).

In the aforementioned isolation circuit system, the digital logic circuit logically processes the received first signal/second signal before accordingly outputting the isolation signal/connection signal to the isolation circuit.

In some optional embodiments, the digital logic circuit includes a NOT gate. An input end of the NOT gate is connected to an output end of the power management unit, and the output end is connected to the isolation circuit; that is, when an input value of the NOT gate is the first signal, i.e., when the value equals to 1, the isolation signal (with the value of 0) is outputted correspondingly; the input value of the NOT gate is the second signal, i.e., when the value equals to 0, the isolation signal (with the value of 1) is outputted correspondingly.

In the above-mentioned isolation circuit system, the isolation circuit simultaneously receives the interactive signal from the first circuit area and the isolation signal from the digital logic circuit, and blocks the above-mentioned interactive signal, or outputs the above-mentioned interactive signal to the second circuit after the interactive signal is processed through the voltage stabilization.

The first circuit area is a power-down area, and the second circuit area is a normally open voltage area.

The isolation circuit simultaneously receives the interactive signal from the first circuit area and the isolation signal/connection signal from the digital logic circuit, and blocks the interactive signal, or outputs the interactive signal to the second circuit area after the interactive signal is processed through the voltage stabilization.

The interactive signal received from the first circuit area includes a write enable signal and a data signal.

The second circuit area includes a register configured to collect a data signal transmitted by the first circuit area. When the second circuit area includes the register, the isolation circuit is configured to simultaneously receive the interactive signal from the first circuit area and the connection signal from the digital logic circuit, and output the interactive signal to the register of the second circuit area after the interactive signal is processed through the voltage stabilization.

As an optional embodiment, the above-mentioned isolation circuit system includes at least one AND gate, and two input ends of each AND gate are respectively connected to the output end of the digital logic circuit and one output end of the first circuit area.

Figure 1B:
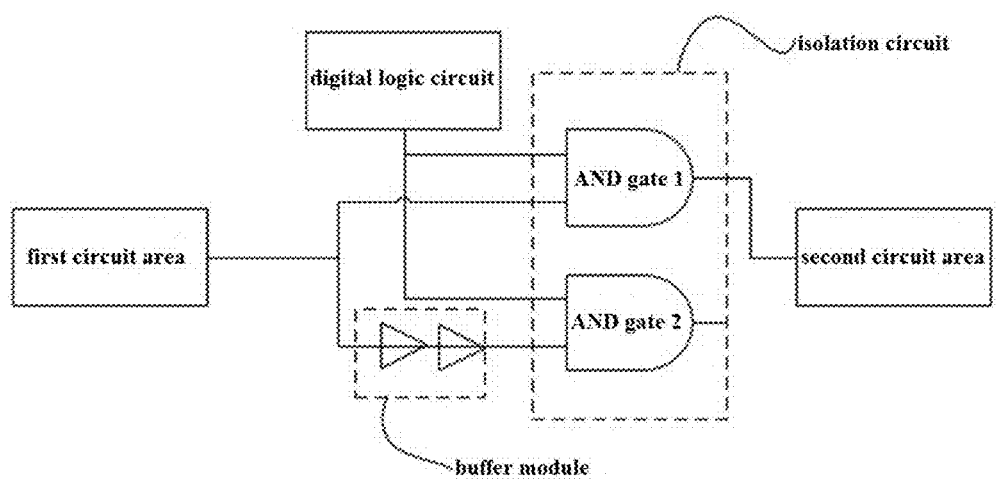
FIG. 1B is a schematic structure diagram of the isolation circuit system according to the embodiment I.

In the embodiment, the isolation circuit includes two AND gates, as shown in FIG. 1B, when the isolation circuit receives an isolation signal (with the value of 0) from the digital logic circuit, the isolation signal and the interactive signal pass through the AND gates, then the above interactive signal is set to be invalid and is isolated, so that the interactive signal cannot be collected by the register of the second circuit area. When the isolation circuit receives a connection signal (with the value of 1) from the digital logic circuit, the connection signal and the interactive signal pass through the AND gates and then are output to the register of the second circuit area.

When the interactive signal includes a data signal, the isolation circuit system further includes a buffer module, as shown in FIG. 1B. The buffer module is connected between the output end of the digital logic circuit and the input end of the AND gate to which the data signal is inputted, and is configured to buffer and then process the isolation signal/ connection signal outputted by the digital logic circuit through the voltage stabilization to output into the second circuit area, such that the data signal is transmitted at the clock sampling frequency of the register of the second circuit area.

Figure 1C:
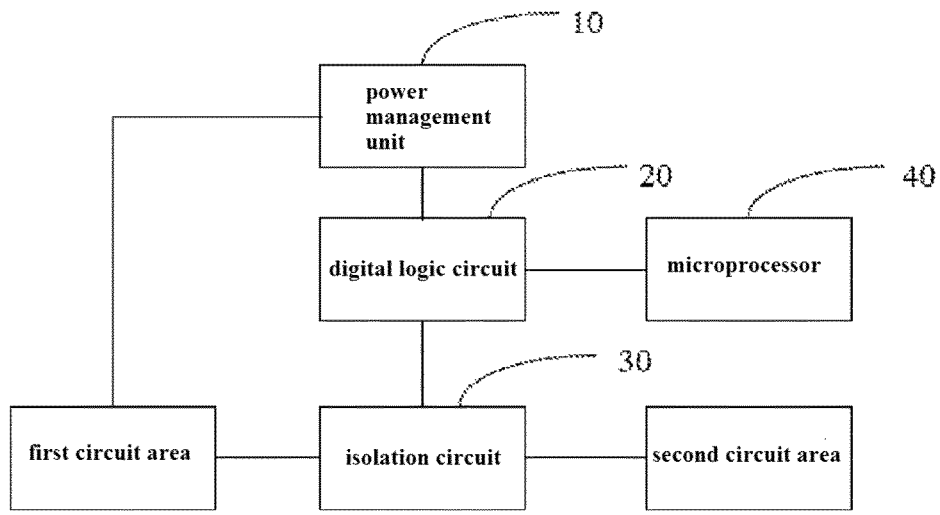
FIG. 1C is a schematic diagram illustrating the isolation circuit system including a microprocessor according to the embodiment I.

In the embodiment, the aforementioned isolation circuit system further includes a microprocessor 40. The system is shown in FIG. 1C. The aforementioned microprocessor is configured to output a third signal to the digital logic circuit when the power down is detected in the first circuit area, and output a fourth signal to the digital logic circuit when no power down is detected in the first circuit area.

When the above-mentioned isolation circuit system includes a microprocessor, the aforementioned digital logic circuit is configured to perform logical processing on the first signal received from the power management unit and the third signal received from the microprocessor and then output the isolation signal to the isolation circuit, and perform the logical processing on the second signal received from the power management unit and the fourth signal received from the microprocessor and then output the connection signal to the isolation circuit.

As an optional embodiment, when the isolation circuit system includes a microprocessor, the digital logic circuit includes a NOR gate, and the two input ends of the NOR gate are respectively connected to the output ends of the power management unit and the microprocessor, and the output end of the NOR gate is connected to the isolation circuit.

When the isolation circuit system includes the microprocessor, the stability of the isolation circuit system can be guaranteed through dual control of the power management unit and the microprocessor.

Embodiment II

Figure 2A:
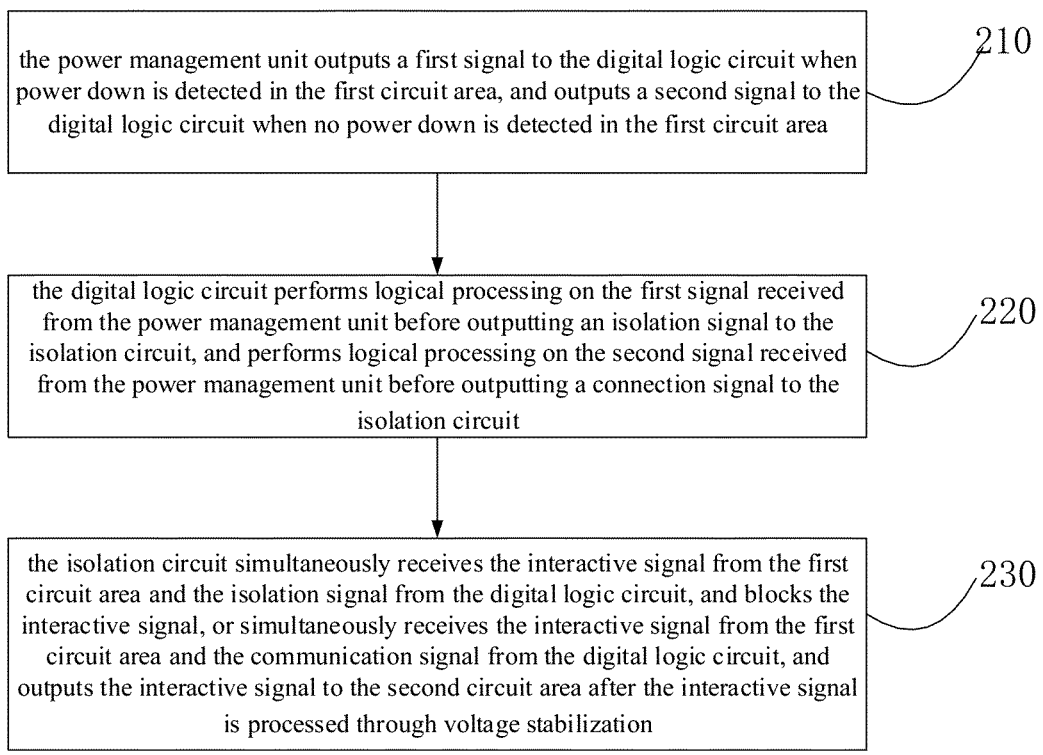
FIG. 2A is a working flow chart of an isolation circuit system according to an embodiment II of the present disclosure.

Based on the same conception, this embodiment provides a signal isolation method for an isolation circuit system. The working flow chart of the isolation circuit system is shown in FIG. 2A, which specifically includes the following steps.

Step 210: the power management unit outputs a first signal to the digital logic circuit when power down is detected in the first circuit area, and outputs a second signal to the digital logic circuit when no power down is detected in the first circuit area.

Step 220: the digital logic circuit performs logical processing on the first signal received from the power management unit before outputting an isolation signal to the isolation circuit, and performs logical processing on the second signal received from the power management unit before outputting a connection signal to the isolation circuit.

Step 230: the isolation circuit simultaneously receives the interactive signal from the first circuit area and the isolation signal from the digital logic circuit, and blocks the interactive signal, or simultaneously receives the interactive signal from the first circuit area and the communication signal from the digital logic circuit, and outputs the interactive signal to the second circuit area after the interactive signal is processed through voltage stabilization.

In the embodiment, when the interactive signal includes a data signal, the isolation circuit receives the isolation signal/ connection signal from the digital logic circuit through the buffer module.

Figure 2B:
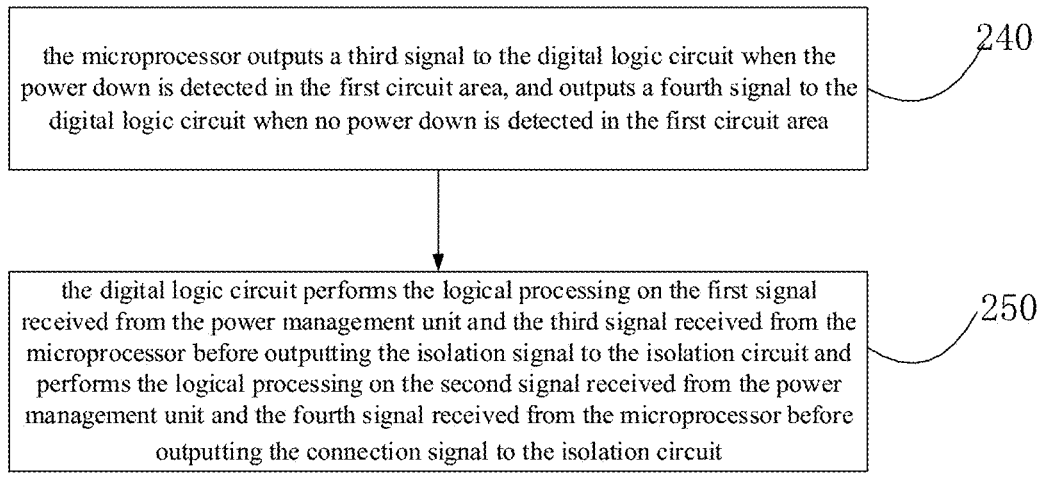
FIG. 2B is a working flow chart of the isolation circuit system including a microprocessor according to the embodiment II.

When the isolation circuit system includes a microprocessor, the above-mentioned signal isolation method for the isolation circuit system, as shown in FIG. 2B, further includes the following steps.

Step 240: the microprocessor outputs a third signal to the digital logic circuit when the power down is detected in the first circuit area, and outputs a fourth signal to the digital logic circuit when no power down is detected in the first circuit area.

Step 250: the digital logic circuit performs the logical processing on the first signal received from the power management unit and the third signal received from the microprocessor before outputting the isolation signal to the isolation circuit and performs the logical processing on the second signal received from the power management unit and the fourth signal received from the microprocessor before outputting the connection signal to the isolation circuit.

When the isolated circuit system includes a microprocessor, the workflows when there is power down in the first circuit area and when there is no power down in the first circuit area are provided as follows.

1) The workflow when there is the power down in the first circuit area is provided as follows.

The power management unit detects the power down in the first circuit area, and outputs the first signal (with a value of 1) to the digital logic circuit.

At the same time, the microprocessor detects the power down in the first circuit area, and outputs the third signal (with a value of 1) to the digital logic circuit.

The digital logic circuit receives the first signal and the third signal, and outputs the isolation signal (with a value of 0) to the isolation circuit after making the first signal and the third signal pass through the NOR gate.

The isolation circuit receives the write enable signal and the data signal transmitted from the first circuit area, respectively makes the write enable signal, the data signal and isolation signal pass through the AND gate, and then sets the write enable signal and data signal (which can be understood as having a value of 0) to be invalid and isolates the write enable signal and data signal.

If the register of the second circuit area cannot detect the write enable signal of a high level (that is, having a value of 1), the data signal is not collected and written.

2) The workflow when there is no power down in the first circuit area is provided as follows.

The power management unit does not detect the power down in the first circuit area, and outputs the second signal (with the value of 0) to the digital logic circuit.

At the same time, the microprocessor does not detect the power down in the first circuit area, and outputs the fourth signal (with the value of 0) to the digital logic circuit.

The digital logic circuit receives the second signal and the fourth signal, and makes the second signal and the fourth signal pass through the NOR gate, and then outputs a connection signal (with the value of 1) to the isolation circuit.

The isolation circuit receives the write enable signal and the data signal transmitted from the first circuit area, and respectively makes the write enable signal, the data signal and the connection signal pass through the AND gate, and then transmits the write enable signal and data signal to the register of the second circuit area.

The register of the second circuit area detects the write enable signal with a high level (that is, having the value of 1), and then the data signal is collected and written.

Embodiment III

This embodiment combines the isolation circuit system provided in the first embodiment and the signal isolation method for the isolation circuit system provided in the second embodiment, and provides specific applications as follows.

With reference to FIGS. 3A, 3B, 3C, 3D, and 3E, working principles are described for the specific application provided by this embodiment.

Figure 3A:
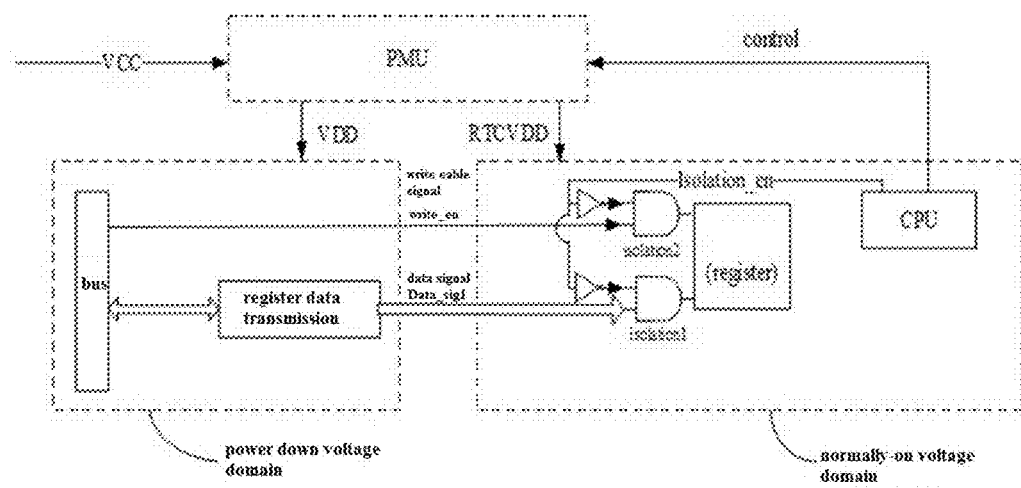
FIG. 3A is a schematic circuit diagram of a common isolation circuit system according to an embodiment III of the present disclosure.

FIG. 3A is a schematic circuit diagram of a common isolation circuit system, which is configured to perform AND operation on the interactive signal (write enable signal and data signal) of the normally open voltage domain outputted from the power-down area and a signal obtained by negating, through a negation circuit, the signal "isolation_en" transmitted by the microcontroller CPU, and fix the value of the interactive signal to 0 before the power-down area is powered down, to ensure a normal operation of the normally open circuit domain when the power-down area is powered down.

Figure 3B:
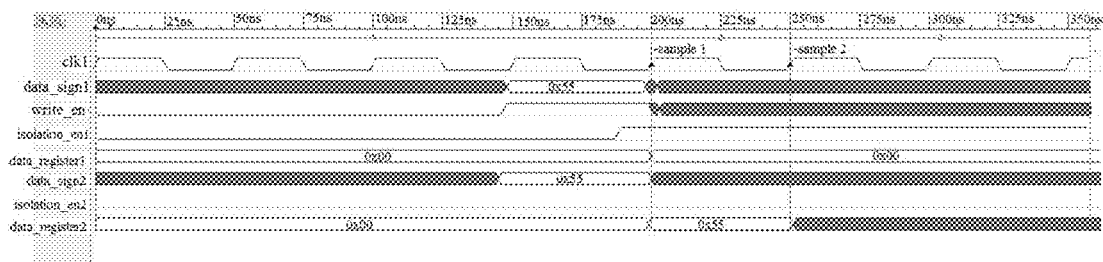
FIG. 3B is a signal sequence analysis diagram based on the common isolation circuit according to the embodiment III.

FIG. 3B is a signal sequence analysis diagram based on the isolation circuit of FIG. 3A, in which:

The signal "isolation_en1" describes that during a normal operation, the CPU first actively issues a control instruction to control the isolation circuit system, and fixes the interactive signal inputted to the normally open voltage domain to 0, and then the CPU initiates a signal requesting power down to the power management unit (PMU), turns off the voltage VDD inputted to the power-down area. The data input signal "datasig1" becomes gray, i.e., an unstable state, due to the power down at the time "sample1", but at this time the register "data_register1" of the normally open voltage domain has cached the fixed state, accordingly the normal operation is not affected.

The signal "isolation_en2" describes an abnormal power down situation, specifically, the CPU has no time to issue an instruction to control the isolation circuit system. At this time, the signal "isolation_en2" has no value (that is, the signal "isolation_en2" is in an invalid state). At the time of "sample1", VDD is turned off and the data of "datasig2" becomes in the unstable state, because an effective control of the signal "isolation_en2" is not received in advance, the register "data_register2" of the normally open voltage domain buffers the unstable data signal state, which causes an abnormality in the normally open voltage domain at this time.

The present disclosure further provides an improved circuit based on the above-mentioned isolation circuit system shown in FIG. 3C, and the workflow thereof is provided as follows.

An improvement I is directed to a situation where the abnormal power down in the power-down area cannot be solved in the isolation circuit system in FIG. 3A, resulting in an abnormal operation in the normally open voltage domain. The specific working principle is provided as follows.

A power-down indication sign signal "control2" indicating that the PMU detects the voltage of the power-down area is added. Once the PMU detects the power down in the power-down area, the value of the "control2" is set to 1. When the PMU does not detect the power down in the power-down area, the value of the "control2" is set to 0 and is input to the input end of the NOR gate in improvement I (the digital logic circuit) in the figure, and the signal "control2" and signal "isolation_en" issued from the CPU pass through the NOR gate before inputting to the normally open voltage domain as "isolation1_en" and "isolation2_en"; when the value of any of "control2" and "isolation_en" is 1 (i.e., the high level is valid), the values of "isolation1" and "isolation2" are both 0; and when the values of "control2" and "isolation_en" are both 0 (i.e., the low level is invalid), the values of "isolation1" and "isolation2" are both 1.

When the power-down area is powered down, the value of "write_en_new" is set to 0 by using "isolation1_en" and the AND gate; and the value of "data_register" is also set to 0 by using "isolation_en 2" and the "AND gate". If the register of the normally open voltage domain does not detect the "write_en_new" with the value of 1, the "data_register" is not collected and written, so as to avoid that the register collects unstable write enable signals and data signals when the power down area is powered down.

When the power-down area is not powered down, the values of "isolation_en 1" and "isolation2_en" are both 1. After passing through the AND gate, the values of "write_en_new" and "data_register" are not affected. When detecting the "write_en_new" with the value of 1, the register of the normally open voltage domain collects and writes the "data_register".

Figure 3C:
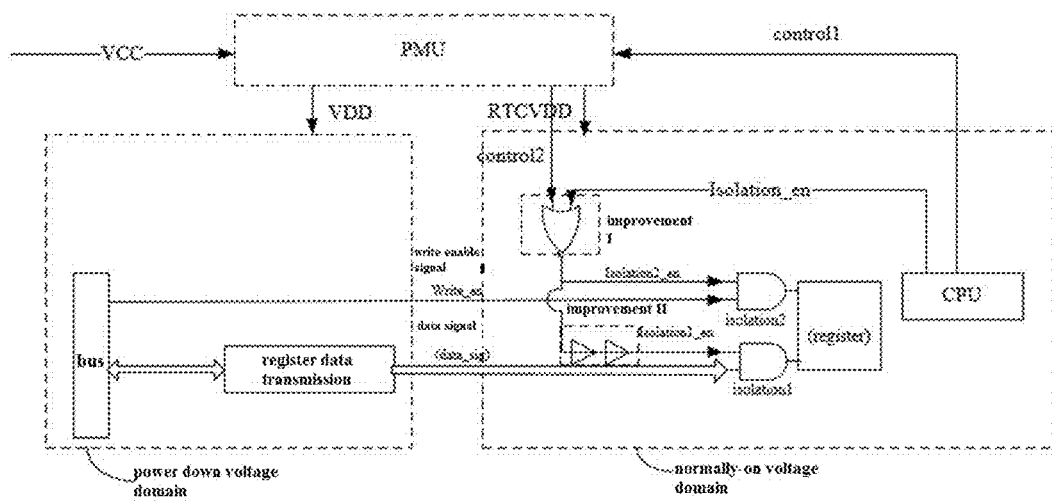
FIG. 3C is a schematic circuit diagram of an improved isolation circuit system according to the embodiment III.

Improvement II in FIG. 3C shows an improvement made to improve a working performance of the improvement I in FIG. 3C. Since sudden abnormal power down in the power-down area occurs randomly, and it is probable that time when the control signals "isolation1_en" and "isolation2_en" function is not at the sample pint of the sampling clock of the register, in the following FIG. 3D is taken as an example to illustrate.

Figure 3D:
FIG. 3D is a signal sequence analysis diagram of the isolation circuit based on improvement I according to the embodiment III.

At the sampling point "sample1" in FIG. 3D, the sampling setup time of the register cannot be satisfied, resulting in sampling errors of the register, as shown in FIG. 3D, the register "data_register1" obtained from the normally open voltage domain appears in an uncertain state (as shown in FIG. 3D, the gray part of "data_register1" represents an uncertain state after the sampling point), resulting in a maloperation in the normally open voltage domain.

The improvement II in FIG. 3C shows an improvement to the situation in FIG. 3D, and the working principle thereof is provided as follows.

As for the circuit in the improvement II, a buffer of level 2 is added to the control signal "isolation1_en" of "isolation1" circuit of the data input end as a delay unit, and the signals "isolation2_en" and "isolation1_en" controlled in a time-sharing stagger mode.

Figure 3E:
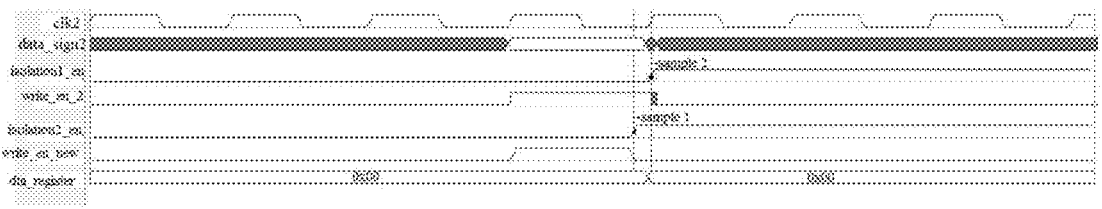
FIG. 3E is a signal sequence analysis diagram of the isolation circuit based on improvement II according to the embodiment III.

Under the action of the improvement II, when the clock sampling is synchronized, the situation where the signals "write_en" and "data_sig" do not have sufficient setup time does not occur simultaneously. As shown in FIG. 3E, the signal "isolation2_en" can rise before passing through the AND gate to generate the signal "write_en_new" when the power-down area is suddenly powered down. At the point "sample1" in FIG. 3E, "write_en_new" goes low, making the write enable signal invalid. The signal "isolation1_en" of the inputted data "data_sig2" is controlled to delay for a period of time before setting at the point "sample2" which is the sampling point of the clock at this time, but because the signal "write_en_new" for controlling data writing has been set as invalid in advance, and the setup time of the data input at the point "sample2" is not satisfied, then the register "data_resiger" of the normally open voltage domain writes a state of data uncertainty.

In this embodiment, the improvement I is combined with the improvement II as a protection circuit for the normally open voltage domain when the power-down area is suddenly powered down, thereby reducing the maloperation of the normally open voltage domain when the power-down area is abnormally powered down.

The technical features of the above-mentioned embodiments can be combined arbitrarily. In order to make the description concise, all possible combinations of the various technical features in the above-mentioned embodiments are not described. However, as long as there is no contradiction in the combination of these technical features, all should be considered as the scope of the present disclosure.

The above-mentioned embodiments merely express several exemplary implements of the present disclosure, and the description is relatively specific and detailed, but it should not be understood as a limitation to the scope of the present disclosure. It should be pointed out that those of ordinary skill in the art can make several transformations and improvements without departing from the concept of the present disclosure, and these all fall within the protection scope of the present disclosure. Therefore, the scope of protection of the present disclosure shall be subject to the appended claims.

What is claimed is:

1. An isolation circuit system, comprising a power management unit, a digital logic circuit and an isolation circuit, wherein
the power management unit is configured to output a first signal to a digital logic circuit when power down is detected in a first circuit area, and output a second signal to the digital logic circuit when no power down is detected in the first circuit area;
the digital logic circuit is configured to perform logical processing on the first signal received from the power management unit before outputting an isolation signal to the isolation circuit, and perform logical processing on the second signal received from the power management unit before outputting a connection signal to the isolation circuit; and
the isolation circuit is configured to simultaneously receive an interactive signal from the first circuit area and the isolation signal from the digital logic circuit and block the interactive signal, or to simultaneously receive the interactive signal from the first circuit area and the connection signal from the digital logic circuit and output the interactive signal to a second circuit area after the interactive signal is processed through voltage stabilization,
wherein the interactive signal outputted from the first circuit area comprises a write enable signal and a data signal, and
wherein the second circuit area comprises a register, and the isolation circuit is configured to output the interactive signal to the register of the second circuit area after the interactive signal is processed through the voltage stabilization when simultaneously receiving the interactive signal from the first circuit area and the connection signal from the digital logic circuit.

2. The system according to claim 1, further comprising:
a microprocessor, configured to output a third signal to the digital logic circuit when the power down is detected in the first circuit area, and output a fourth signal to the digital logic circuit when no power down is detected in the first circuit area;
the digital logic circuit, configured to perform logical processing on the first signal received from the power management unit and the third signal received from the microprocessor before outputting the isolation signal to the isolation circuit, and perform logical processing on the second signal received from the power management unit and the fourth signal received from the microprocessor before outputting the connection signal to the isolation circuit.

3. The system according to claim 2, wherein the digital logic circuit comprises a NOR gate, and two input ends of the NOR gate are respectively connected to output ends of the power management unit and the microprocessor, and an output end of the NOR gate is connected to the isolation circuit.

4. The system according to claim 1, wherein the digital logic circuit is configured to perform a NOT processing on the first signal or the second signal to generate the corresponding isolation signal or connection signal.

5. The system according to claim 1, wherein the isolation circuit comprises at least one AND gate, two input ends of each AND gate are respectively connected to the output end of the digital logic circuit and one output end of the first circuit area.

6. The system according to claim 5, wherein the interactive signal comprises a data signal, and the system further comprises:
a buffer module, connected between the output end of the digital logic circuit and an input end of the AND gate to which the data signal is inputted, and configured to buffer the isolation signal/connection signal outputted by the digital logic circuit and then output the isolation signal/connection signal to the second circuit area after the isolation signal/connection signal is processed through the voltage stabilization.

7. The system according to claim 1, wherein the first circuit area is a power down area, the second circuit area is a normally open voltage domain.

8. A signal isolation method, comprising:
outputting, by a power management unit, a first signal to a digital logic circuit when power down is detected in a first circuit area, and outputting a second signal to the digital logic circuit when no power down is detected in the first circuit area;
performing, by the digital logic circuit, logical processing on the first signal received from the power management unit before outputting an isolation signal to an isolation circuit, and performing logical processing on the second signal received from the power management unit before outputting a connection signal to the isolation circuit; and
simultaneously receiving, by the isolation circuit, an interactive signal from the first circuit area and the isolation signal from the digital logic circuit, and blocking the interactive signal, or simultaneously receiving the interactive signal from the first circuit area and the connection signal from the digital logic circuit, and outputting the interactive signal to a second circuit area after the interactive signal is processed through voltage stabilization,
wherein the interactive signal comprises a data signal, and the receiving, by the isolation circuit, the isolation signal/connection signal from the digital logic circuit comprises receiving, by the isolation circuit, the isolation signal/connection signal from the digital logic circuit through a buffer module.

9. The method according to claim 8, further comprising:
outputting, by a microprocessor, a third signal to the digital logic circuit when the power down is detected in the first circuit area, and outputting a fourth signal to the digital logic circuit when no power down is detected in the first circuit area;

wherein the performing, by the digital logic circuit, logical processing on the first signal received from the power management unit before outputting the isolation signal to the isolation circuit, and performing logical processing on the second signal received from the power management unit before outputting the connection signal to the isolation circuit comprises:

performing logical processing on the first signal received from the power management unit and the third signal received from the microprocessor before outputting the isolation signal to the isolation circuit, and performing logical processing on the second signal received from the power management unit and the fourth signal received from the microprocessor before outputting the connection signal to the isolation circuit.

* * * * *